US007711898B2

(12) United States Patent
Sodani et al.

(10) Patent No.: US 7,711,898 B2
(45) Date of Patent: May 4, 2010

(54) REGISTER ALIAS TABLE CACHE TO MAP A LOGICAL REGISTER TO A PHYSICAL REGISTER

(75) Inventors: Avinash Sodani, Portland, OR (US); Stephan J. Jourdan, Portland, OR (US); Samie B. Samaan, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 531 days.

(21) Appl. No.: 10/737,760

(22) Filed: Dec. 18, 2003

(65) Prior Publication Data

US 2005/0138338 A1    Jun. 23, 2005

(51) Int. Cl.
G06F 12/00    (2006.01)
(52) U.S. Cl. .................. 711/118; 711/133; 711/206; 712/217
(58) Field of Classification Search ......... 711/206–208, 711/133, 159, 165, 118, 131, 126; 712/23, 712/217
See application file for complete search history.

(56) References Cited

U.S. PATENT DOCUMENTS 6,308,259 B1 * 10/2001 Witt ........................... 712/214
6,510,508 B1 * 1/2003 Zuraski et al. .............. 711/207
6,594,754 B1 * 7/2003 Jourdan et al. .............. 712/217
2005/0015659 A1 * 1/2005 Pomaranski et al. .......... 714/11

OTHER PUBLICATIONS

Hennessy, John L. and David A Patterson; "Computer Organization and Design", 1998, Morgan Kaufmann, pp. 589-590.*

* cited by examiner

Primary Examiner—Christian P Chace
Assistant Examiner—Matthew Bradley
(74) Attorney, Agent, or Firm—Kenyon & Kenyon LLP

(57) ABSTRACT

Embodiments of the present invention relate to a system and method for implementing functions of a register translation table of a computer processor, with reduced area requirements as compared to known arrangements. In one embodiment, an apparatus may comprise a register alias table cache to map a logical register to a physical register. The register alias table cache may have a capacity corresponding to a subset of architectural logical registers. The apparatus may further comprise store logic coupled to the cache to perform operations to save an existing content of the physical register if a cache entry corresponding to the logical register is evicted from the cache. The apparatus may also comprise load logic coupled to the cache to perform operations to load a content to the physical register and to form a new entry in the cache if a needed mapping is not present in the cache.

20 Claims, 5 Drawing Sheets

REGISTER ALIAS TABLE CACHE TO MAP A LOGICAL REGISTER TO A PHYSICAL REGISTER

FIELD OF THE INVENTION

The present invention relates to computers, and more specifically to a system and method for implementing functions of a register alias table of a computer processor, with reduced area requirements as compared to known arrangements.

BACKGROUND OF THE INVENTION

Register alias tables are known in computer processors. A register alias table (RAT) may be used to map a logical register, for example as referred to in an operand of a software instruction, to a physical register actually used to carry out the instruction. "Map" as used here means to define a correspondence between. Reading and writing to the RAT for purposes of performing the mapping may be referred to as "renaming" instructions RATs are increasingly becoming heavily-ported structures. "Ported" refers to how the contents of a RAT are read and written. Each instruction that refers to registers requiring mapping in a RAT may require a plurality of corresponding RAT entries that need to be read/written. For example, computer instructions known as "uops" ("micro-operations") may have 2 source register fields and 1 destination register field. Therefore, accessing entries in a RAT corresponding to each of these register fields may require 3 read ports and 1 write port: 2 read ports for the 2 source fields, a read port for the destination field, and a write port for the destination field. For a processor that renames 4 uops per cycle, therefore, 12 read ports and 4 write ports may be required.

As structures become more heavily ported, they must typically become larger, consequently incurring a greater penalty in terms of area requirements, access latency and power consumption. This may be seen by considering that, for example, a RAT entry requiring 16 ports as described above needs to have memory cells with areas respectively able to accommodate 16 word lines and 16 bit lines; i.e., area requirements may increase on the order of a power of 2 as ports are added, with corresponding latency effects and increased power consumption. Such disadvantages are, of course, further exacerbated as the number of entries in a RAT increases. The latter may be of particular concern in processors that need to run multiple threads simultaneously, because the RAT needs to store mappings for architectural registers for each thread.

DETAILED DESCRIPTION

Figure 1:
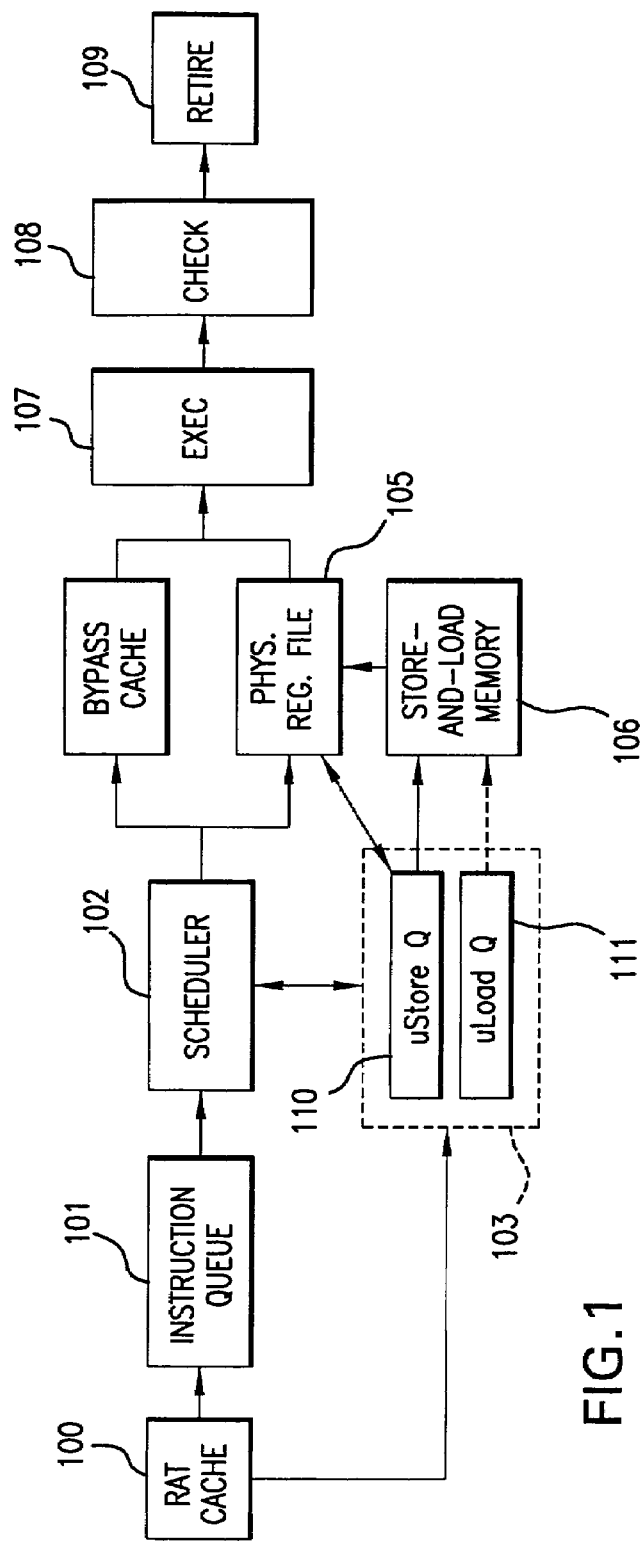
FIG. 1 shows a system according to embodiments of the present invention.

Embodiments of the present invention relate to a system and method for providing the functions of a RAT, but storing fewer entries, and consequently requiring a smaller area, than what is typically associated with a "full-sized" RAT. As a result, power requirements and access latency may also be reduced. Because, however, this smaller area may not necessarily simultaneously accommodate all needed mappings, mechanisms may be provided for storing and retrieving, in an associated memory, information needed to provide the RAT function notwithstanding that needed mappings may at times be absent.

A full-sized RAT may need to store all architectural registers associated with multiple threads being executed by a processor. "Architectural" registers is a term that may be used to refer to the logical registers defined in the instruction set of a given processor architecture. As is known, architectural registers in a computer may contain information that, cycle-by-cycle, represents a status or "context" of a given program thread. Accordingly, as the number of threads that need to be simultaneously executed increases, the required RAT size may correspondingly increase.

As noted earlier, the RAT maps logical registers, for example as specified in program code that may correspond to a thread, to actual physical registers present in a given computer architecture. This RAT mapping function is needed, among other reasons, to eliminate "false dependencies" between instructions of the same thread that can cause unnecessary delay. An example of a false dependency is when a first instruction of a thread, say, uop1, and a second instruction of the same thread, say, uop2, both write to the same logical register, say, logical register L. It is assumed that uop2 is later in the program code as written than uop1, and that uop2 does not read L. If registers were not renamed, both uop1 and uop2 would refer to the same physical register for write operations on L, which could lead to unnecessary delay. For example, it would have to be ensured that when uop2 executed, it did not overwrite the result of uop1's execution before all other instructions that needed to read the result of uop1's execution had also completed. This enforces a "false" dependency between uop1 and uop2, where uop2's execution is restricted by uop1, when this was not intended by the programmer, since there is no data dependency between uop1 and uop2, and therefore uop2 need not wait for uop1. Register renaming helps to eliminate such false dependencies, and consequent delay, by assigning a new and a unique physical register to every instruction writing to a logical register. Thus, in the above example, uop1 and uop2 would have each have been assigned a different physical register for L, and instructions with actual data dependencies on uop1 and uop2, respectively, would have picked up the correct physical register to read from the RAT. Accordingly, with register renaming, uop1 and uop2 can execute in any order, even in parallel.

It has been observed that it is typically the case that only a small subset of logical registers are frequently accessed during thread execution. Thus, according to embodiments of the present invention, a memory may be provided for RAT mapping, where the memory is of a size that does not need to accommodate as large a number of mappings as is typical for a full-sized RAT. Instead, the RAT memory may only be of a size able to accommodate a number of entries corresponding to the subset of frequently-accessed logical registers. Because the RAT memory is thus configured to hold fewer entries than a full-sized RAT, the heavy porting associated with the RAT function may be implemented with lower area and power requirements.

However, the smaller size of the RAT memory may mean that it cannot simultaneously hold all needed mappings. Thus, according to embodiments of the invention, mechanisms may be provided for offloading mappings from the RAT memory by storing register contents corresponding to less-frequently accessed mappings in an associated memory. The mechanisms may further provide for retrieving needed register contents from the associated memory and forming a corresponding new mapping in the RAT memory. FIG. 1 illustrates such mechanisms according to embodiments of the present invention. Referring to FIG. 1, embodiments of the present invention may comprise a RAT memory 100. The RAT memory 100 may be a cache memory (hereinafter, "RAT cache"). The RAT cache 100 may be coupled to store-and-load logic 103 comprising a store queue (uStoreQ) 110 and a load queue (uLoadQ) 111. The uStoreQ 110 and uLoadQ may each be accessed, for example, via "head" and "tail" pointers, where the head pointer points to the oldest entry and the tail pointer points to the newest entry.

The store-and-load logic 103 may further be coupled to a store-and-load memory 106. The store-and-load logic 103 may be used to perform operations associated with "evicting" (removing) infrequently-accessed entries from the RAT cache and storing the corresponding register contents in the store-and-load memory 106. As part of these operations, a physical register file 105 may be accessed. The physical register file 105 may be an array of randomly-accessible physical registers, used to hold and perform arithmetic and logical operations on data corresponding to various logical registers. When evicting an entry from the RAT cache 100, the contents of a corresponding physical register may be copied to the store-and-load memory 106. The store-and-load logic 103 may further be used for retrieving contents of a register from the store-and-load memory 106 that, when needed, is not mapped in the RAT cache. As part of these operations, contents corresponding to an entry in the store-and-load memory 106 may be copied into a physical register in the physical register file 105, and a corresponding new mapping may be inserted in the RAT cache 100. Because the most-frequently accessed entries will typically be present in the RAT cache 100, the store-and-load memory 106 will need to be accessed by the store-and-load logic 103 much less frequently than will the RAT cache 100, or than a full-sized RAT would be. Consequently, the store-and-load memory 106 may be formed with far fewer ports and be significantly smaller.

The above-described components may operate in association with conventional elements also illustrated in FIG. 1: for example, the RAT cache 100 may further be coupled to an instruction queue 101, which may be coupled to a scheduler 102. The instruction queue may hold instructions before they are inserted in the scheduler 102; the scheduler 102 may hold instructions until they are ready to execute, and then dispatch them for execution to an execution unit 107. An instruction (e.g., a uop) may be considered ready for execution after its source operands have been produced. The scheduler 102 may further be coupled to physical register file 105. The physical register file may in turn be coupled to an execution unit 107 for instruction execution; the execution unit may be coupled to a check logic block 108 for checking whether the instruction executed correctly or not. The check logic block 108 may be coupled to a retire logic block 109 for committing to the instruction's results if the instruction executed correctly, and to the scheduler 102 for re-executing the instruction if the instruction did not execute correctly (a connection between the check logic block 108 and the scheduler 102 is not shown to avoid cluttering the figure).

Figure 2:
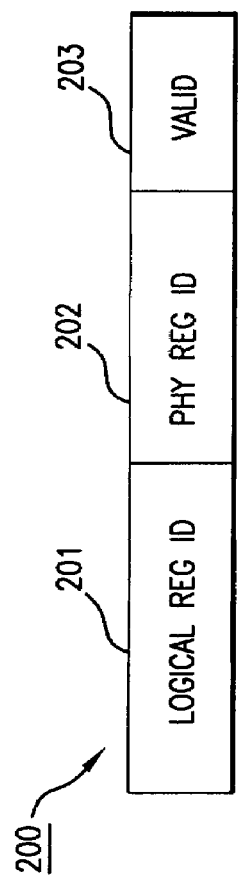
FIG. 2 shows an example of an entry in a RAT cache according to embodiments of the invention.

The RAT cache 100 may be configured to be used for instruction renaming in substantially the same way as is a full-sized RAT as described above. FIG. 2 shows one possible configuration of an entry 200 in the RAT cache 100. The entry may comprise an identifier of a logical register 201 (Logical Reg ID), an identifier of a physical register 202 (Phy Reg ID) mapped to the logical register, and a valid field 203, which may indicate that the mapping is valid.

As noted earlier, the RAT cache 100 may be configured to hold a smaller number of entries as compared to a full-sized RAT. More specifically, the RAT cache 100 may be configured to hold a number of entries corresponding to a subset of most-frequently-accessed logical registers. Accordingly, the size of the RAT cache 100 is somewhat arbitrary, but criteria involved in determining its size could involve an analysis of statistics relating to the frequency of access to logical registers. For example, by collecting statistics it could be determined that a number N of logical registers are accessed with X percent frequency during some time interval, where X is some predetermined arbitrary threshold. Accordingly, the RAT cache 100 could be sized for around N entries, based on some arbitrary frequency-of-access-threshold X.

The RAT cache 100 could be populated by execution of threads. That is, as one or more threads is executed and uses a logical register in the course of execution, corresponding entries may be made in the RAT cache. Each entry may map a logical register and a physical register as shown in FIG. 2. As thread execution proceeds, the RAT cache 100 may become full; i.e., all available entries may contain mappings. Then, an entry for a new mapping may need to be formed. When this occurs, an older entry may be evicted from the RAT cache to make room for the new entry. An entry may be evicted, for example, based on its being the least-frequently accessed. When an entry is evicted, however, the corresponding logical register value may need to be saved in case it is needed later.

According to embodiments of the invention, the store and load logic 103 may be used to save the logical register value of an evicted entry. More specifically, store micro-code for performing a store operation comprising copying the value (the contents) of the logical register mapped in the evicted entry from the corresponding physical register into the store-and-load memory 106 may be dynamically generated, placed in the uStoreQ 110, and eventually executed. This store operation may be referred to hereinafter as a "uStore" ("micro-Store").

In view of the foregoing, it may occur that an instruction may need to access the contents of a logical register whose mapping is no longer present in the RAT cache 100. Such an occurrence is referred to herein as a "miss". When a miss occurs, according to embodiments of the invention, the store and load logic 103 may be used to handle the miss. More specifically, load micro-code for performing a load operation comprising allocating a physical register and copying the contents of the missed logical register from the store-and-load memory 106 into the allocated physical register may be dynamically generated, placed in the uLoadQ 111, and eventually executed. An entry for the newly-allocated physical register and corresponding logical register may be made in the RAT cache. The load micro-code may be generated, for example, when an instruction (e.g., a uop) having the missing logical register as a source register attempts to execute. The uop may supply the source register to the load micro-code, then wait for it to execute. The load operation may be referred to hereinafter as a "uLoad" ("micro-Load").

Figure 3:
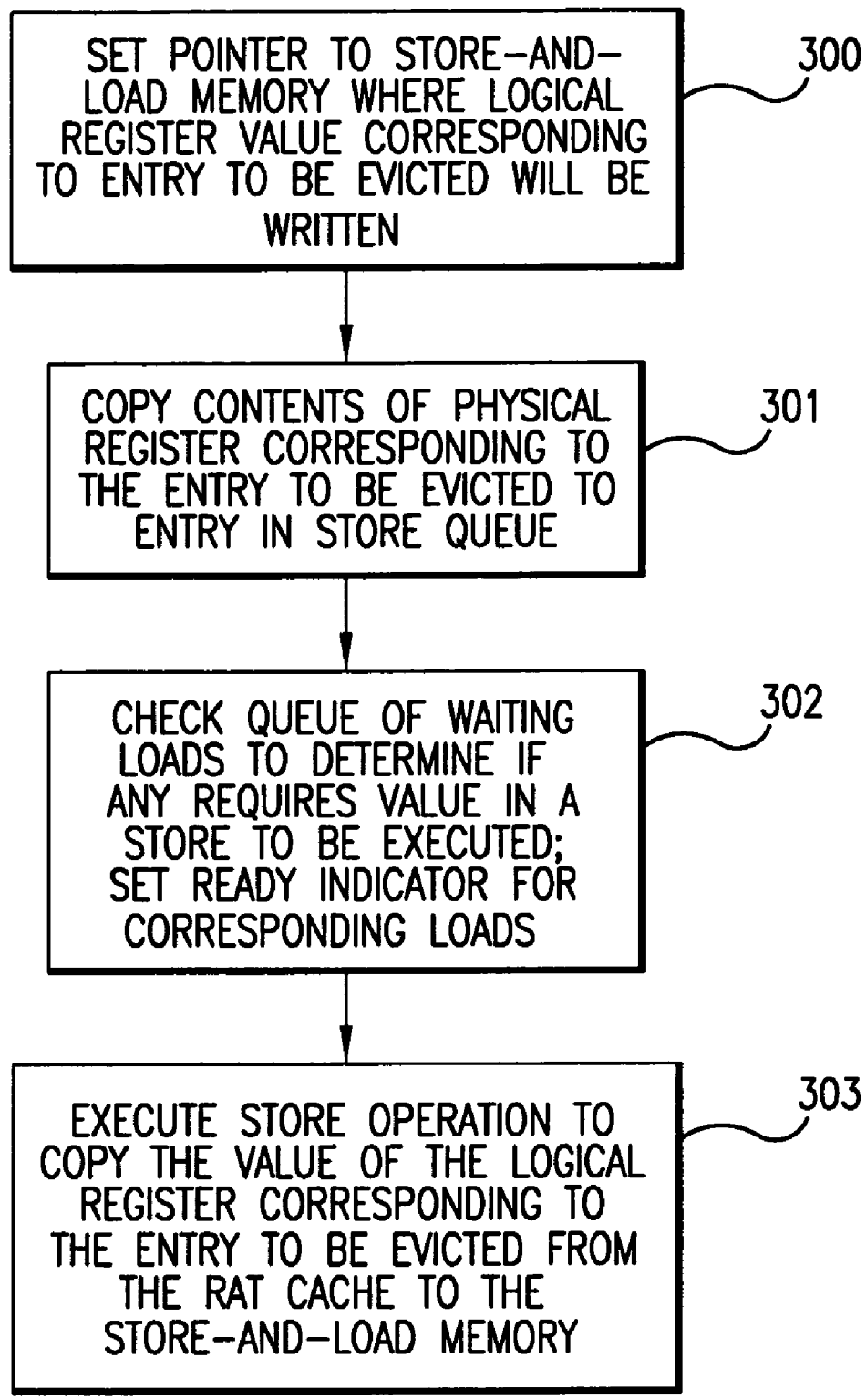
FIG. 3 shows a process flow for a store operation according to embodiments of the invention.

FIG. 3 shows a flow of operations corresponding to a store operation according to embodiments of the invention. As shown in block 300, a pointer may be set to a location in the store-and-load memory 106 where the logical register value corresponding to the entry to be evicted from the RAT cache 100 will be copied/written. An identifier of the logical register itself may serve as the pointer to the location in the store-and-load memory. Then, the contents of the logical register corresponding to the entry to be evicted may be copied from the corresponding physical register to an entry in the store queue, block 301.

As will be described in more detail further on, the store operations and the load operations may be to a certain extent interdependent. Accordingly, as shown in block 302, the store operation may further comprise checking waiting load operations in the load queue to determine if any load operation requires a value to be stored by a store operation. If so, a ready indicator may be set in a corresponding load.

As shown in block 303, the store operation may then be executed to copy/write the value of the logical register corresponding to the entry to be evicted from the RAT cache to the store-and-load memory.

Figure 4:
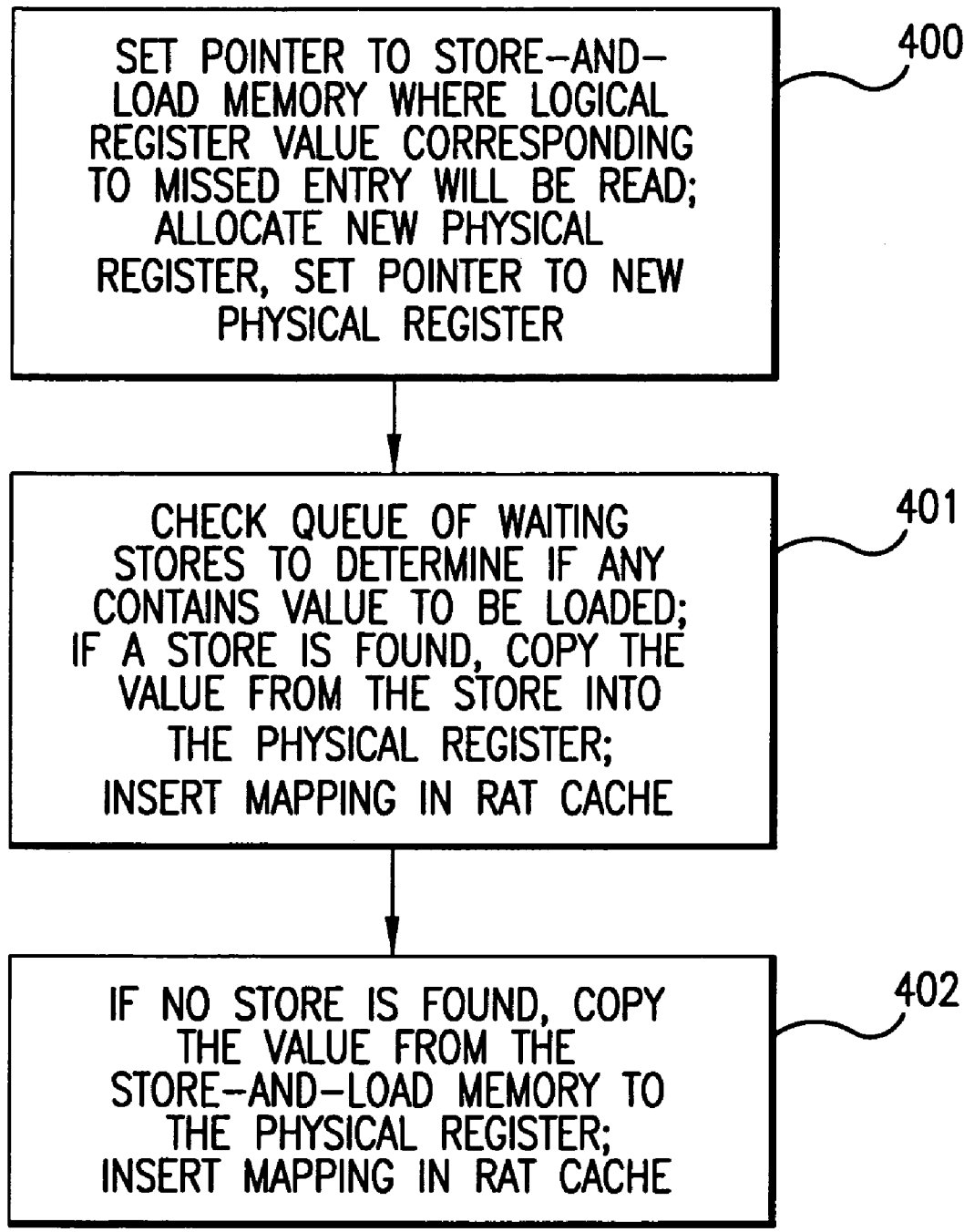
FIG. 4 shows a process flow for a load operation according to embodiments of the invention.

FIG. 4 shows a flow of operations corresponding to a load operation according to embodiments of the invention. As shown in block 400, a pointer may be set to a location in the store-and-load memory 106 from where a "missed" logical register value, possibly earlier evicted from the RAT cache 100, will be copied/read. The identifier of the logical register itself may serve as the pointer to the location in the store-and-load memory. A new physical register for the value to be read from the store-and-load memory may be allocated, and a pointer set to it.

As shown in block 401, the queue of waiting store operations may be checked to determine if any contains the value of the register to be loaded. If so, the value may be copied from the corresponding entry in the store queue to the newly-allocated physical register, and a corresponding new mapping may be inserted in the RAT cache.

On the other hand, as shown in block 402, if the value of the register to be loaded is not found in the store queue, it may be copied/read from the store-and-load memory 106 into the newly-allocated physical register, and a corresponding new mapping may be inserted in the RAT cache.

"Micro-Stores" ("uStores")

Recalling that a function of the uStore is to save the value of a logical register whose mapping is about to be evicted from the RAT cache 100, according to embodiments, a uStore may comprise two parts: a "uSta" ("uSt-address") and a "uStd" ("uSt-data"). The uSta component may flow through the uStoreQ 110: i.e., be inserted at the tail and make its way to the head before execution. The uStd component, on the other hand, may flow through the normal execution pipeline of the processor: more specifically, for example, referring to FIG. 1, through the instruction queue 101, the scheduler 102, and so on. When executed, the uStd may copy the value (contents) of the physical register mapped to the logical register in the entry to be evicted from the RAT cache to a corresponding uSta component in the uStoreQ. When the uSta reaches the head of the uStoreQ, executes and is retired, the uSta may copy the value to the store-and-load memory 106.

Figure 5:
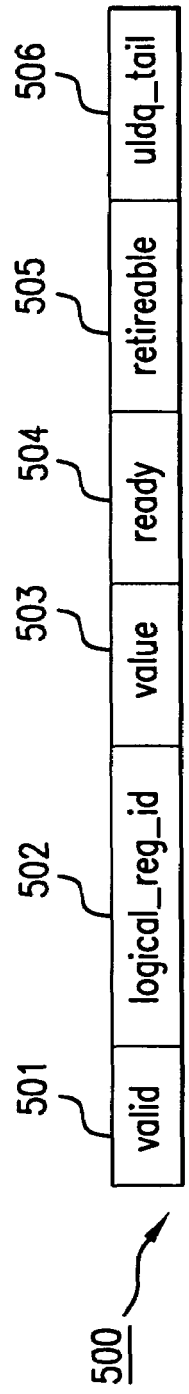
FIGS. 5-7 show examples of fields in micro-code according to embodiments of the invention.
Figure 6:
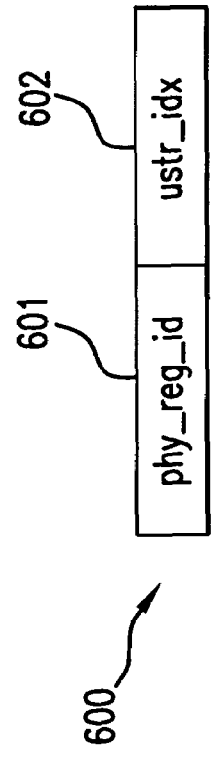

FIG. 5 shows one possible configuration of a uSta 500 which could be inserted as an entry in the uStoreQ 110, based upon conditions indicating a need to evict an entry from the RAT cache (e.g. all RAT cache entries contain mappings and a new mapping needs to be inserted). The uSta 500 may comprise a valid field 501, a field containing the logical register id, which also serves as the pointer to the store-and-load memory 502, a value field 503 to hold the value of the physical register corresponding to the logical register in the mapping being evicted, a ready field 504, a retireable field 505, and a pointer 506 to the tail of the uLoadQ (uldq_tail). FIG. 6 shows one possible configuration of a corresponding uStd 600. The uStd 600 may comprise a physical register identifier field (phy_reg_id) 601, and a pointer 602 to the uStd's corresponding uSta in the uStoreQ (ustr_idx).

The following describes a series of operations corresponding to the process illustrated in FIG. 3. The operations may include setting values of fields of a uSta 500 when it is initially inserted at the tail of the uStoreQ. For example, as shown in FIG. 3, a pointer may be set to a location in the store-and-load memory 106 where the logical register value corresponding to the entry to be evicted from the RAT cache 100 is to be copied/written. More specifically, the logical_reg_id field 502 of the uSta may be set equal to the value of the Logical Reg ID field 201 corresponding to the entry to be evicted from the RAT cache 100.

Further operations on the fields of the uSta may be performed to prepare it for execution. The valid field 501 may be set to a value of logic "1", the ready field 504 may be set to a value of logic "0", and the retireable field 505 may be set to a value of logic "0". These settings may indicate a uSta that needs to be executed but is not yet ready. A criterion for whether the uSta is ready to execute may be whether the corresponding uStd has yet copied the contents of the physical register corresponding to the RAT cache entry being evicted into the value field 503 of the uSta. Further, the uldq_tail field 506 of the uSta may be set to the current value of the uLoadQ tail. This value may be used later as a bound for a check performed on uLoads waiting in the uLoadQ. The uLoads are described in more detail below.

Fields in the corresponding uStd 600 may also be set when a new uSta is initially inserted in the uStoreQ. More specifically, the identifier of the physical register corresponding to the entry being evicted may be stored in the phy_reg_id field 601 of the uStd, and the value of pointer 602 may be set equal to the tail of the uStoreQ. The phy_reg_id field 601 of the uStd may point to a register in the physical register file 105.

As noted earlier, the uStd may flow through the normal pipeline, and be scheduled for execution when its dependencies are satisfied. When the uStd executes, it may copy the contents of the physical register pointed to by its phy_reg_id field 601 and corresponding to the entry being evicted, into the value field 503 of the uSta, waiting in the uStoreQ, pointed to by the uStd's ustr_idx pointer 602. The uStd may also set the ready field 504 of the corresponding uSta to logic "1", to indicate that the uSta is now ready to execute.

As explained in more detail further on, readiness of uLoads waiting in the uLoadQ may depend in part on the readiness of uStas that may contain register values needed by the uLoads. Thus, the queue of waiting loads may be checked to determine whether any requires a value in a uSta to be executed. More specifically, one or more of the waiting uLoads may include a ustr_idx field that points to a uSta containing a register value needed by the uLoads. When the uStd makes a uSta ready to execute as described above, the waiting uLoads may be checked for whether any contains a ustr_idx field that matches the ustr_idx field 602 of the uStd; i.e, the ustr_idx field pointing to the uSta just made ready. According to embodiments, this could be done, for example, by "camming" the ustr_idx field 602 of the uStd with the ustr_idx fields of the uLoads in the uLoadQ 111. The term "camming" is derived from CAM (content addressable memory), and refers to an operation wherein fields are compared to determine whether they match. The range of the camming operation may be between the value of the ustr_idx pointer 602 and the value of the uldq_tail pointer 506, which as noted above, points to the newest uLoadQ entry at the time the uSta was inserted in the uStoreQ. If any matches are detected by the camming operation, "ready" and "done" indicators in corresponding uLoadQ entries may be set. The "ready" and "done" indicators are used in controlling execution of the uLoads, as described in more detail below.

When the uop that caused the uStore to be generated is ready to retire, all uStores generated by that uop may be marked retireable, for example, by setting the respective retireable fields 504 of the uStas equal to logic "1", starting with the oldest uStore in the trace. After a uSta is marked retireable, it may execute to write the logical register value stored in its value field 503, i.e., the value corresponding to an entry to be evicted from the RAT cache, to the store-and-load memory 106, at a location pointed to by the uSta's logical_reg_id field 502. The valid field 501 of the uSta may be set to logic "0" and the head pointer of the uStoreQ may be incremented.

"Micro-Loads" ("uLoads")

Figure 7:
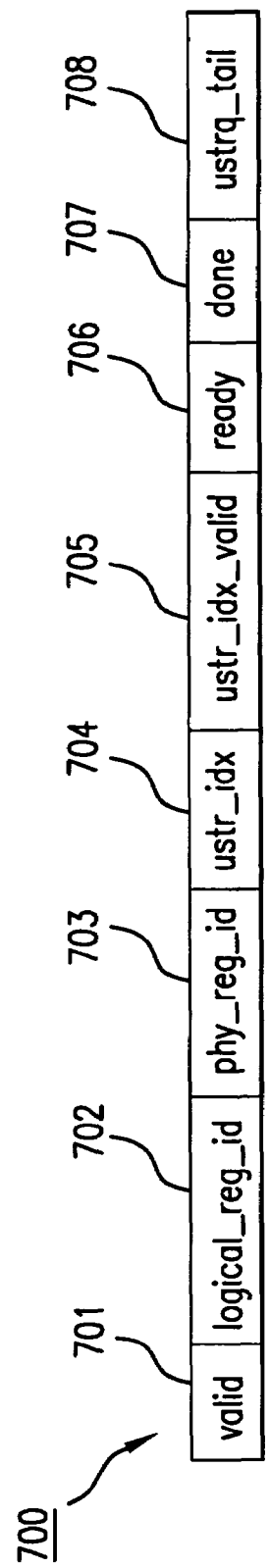

Recalling that a purpose of the uLoad is to copy the value of a missed logical register from the store-and-load memory 106 into a physical register and map the physical register to the missed logical register in the RAT cache 100, FIG. 7 shows one possible configuration of a uLoad 700 which may be inserted as an entry in the uLoadQ 111. The uLoad 700 may comprise a valid field 701, a field pointing to the store-and-load memory 106 entry containing the value of the missed logical register (logical_reg_id) 702 (this value may be obtained, as described above, from the source register of a uop unable to find a mapping for the source register in the RAT cache), a field pointing to a physical register in the physical register file 105 (phy_reg_id) 703, a pointer 704 to an entry in the uStoreQ (ustr_idx), a valid field 705 corresponding to the uStoreQ pointer (ustr_idx_valid), a ready field 706, a done field 707, and a pointer 708 to the tail of the uStoreQ (ustrq_tail). A new uLoad may be inserted at the tail of the uLoadQ 111, and eventually make its way to the head of the uLoadQ for execution.

The following describes a series of operations corresponding to the process illustrated in FIG. 4. The operations may include setting values of fields of a uLoad 700 when it is initially inserted at the tail of the uLoadQ. For example, as noted in FIG. 4, a pointer may be set to the store-and-load memory 106 from which the value of the missed logical register will be read. More specifically, the logical_reg_id field 702 may be set equal to a pointer to the store-and-load memory entry containing the contents of the missed logical register. Further, a new physical register may be allocated, and the phy_reg_id field 703 may be set equal to the identifier of the newly-allocated physical register.

Further operations on the fields of the uLoad 700 may be performed to prepare it for execution. The valid field 701 may be set to a logic "1" value to indicate that the uLoad needs to be executed, and the done field 707, which may be used to indicate that the uLoad has executed, may be set to logic "0". These settings may indicate a uLoad that needs to be executed but is not yet ready. A criterion for whether the uLoad is ready to execute may be whether the uStoreQ has been checked for whether it has an entry containing the value of the missed logical register. This could be the case if, for example, the mapping of the logical register had recently been evicted but the value of the logical register had not yet been written to the store-and-load memory 106.

The typical case will be that the mapping missed logical register will not be one that was recently evicted. If it were recently evicted, on the other hand, there is the possibility that a uStore (or more specifically, a uSta 500) of contents of the missed logical register is still present in the uStoreQ 110. Accordingly, the entries of the uStoreQ may be checked to determine if the uStoreQ contains a uSta for the missed logical register, notwithstanding that the uSta may not yet contain the value of the logical register. According to embodiments, this could be done, for example, by camming the logical_reg_id field 702 of the uLoad with a logical_reg_id field 502 of the uStoreQ entries.

If a matching uSta is found, i.e., one having a logical_reg_id field matching that of the uLoad of the missed logical register, the ustr_idx pointer 704 of the uLoad may be set to point to the matching uSta. In addition, the ustr_idx_valid field 705 may be set to logic "1", as an indication that, once the uLoad is ready to execute, the uStoreQ should be checked for whether it still contains the matching uSta. For purposes of this check, the value of the current uStoreQ tail pointer may be stored in the ustr_tail field 708, to act as a bounding value in the check. A criterion for whether the uLoad is ready to execute may be whether the matching uSta itself is ready to execute (recalling that a criterion for when the uSta is ready to execute is when the value of the register to be stored has been copied into the uSta by the corresponding uStd). Accordingly, the ready field 706 of the uLoad may be set to whatever the value of a corresponding ready indicator 504 of the matching uSta is.

If, on the other hand, no matching uSta is found, the ustr_idx_valid field 705 may be set to logic "0", and the ready field 706 of the uLoad may be set to logic "1", which together indicate that the uLoad does not need to do any more checking for matching uStas, and that the uLoad is ready for execution.

The "oldest" ready uLoad may be selected for execution each cycle. Accordingly, the head entry of the uLoadQ 111 may be checked for whether it contains a ready uLoad (e.g., ready field 706 has logic value "1", and done field 707 has logic value "0"). If the head entry is ready, a check may be performed for whether the ustr_idx_valid field 705 has a value of logic "1", indicating that earlier, a matching uSta was found in the uStoreQ. If the ustr_idx_valid field 705 has a value of logic "1", it may be determined whether the ustr_idx field 704 has a value that is between the value of the current uStoreQ head pointer and the value of the ustrq_tail field 708, which was set when the uStoreQ was checked earlier for matching uStores. If so, this means that the matching uSta is still in the uStoreQ. Accordingly, the value of the corresponding logical register may be copied from value field 503 of the matching uSta entry (the entry pointed to by the ustr_idx field 704) into a physical register in the physical register file pointed to by the phy_reg_id field 703.

On the other hand, it will be more typically the case, as noted earlier, that there will be no matching uSta. Accordingly, the ustr_idx_valid field 705 may have a value of logic "0". In this case, the value in the store-and-load memory 106 pointed to by the logical_reg_id field 702 may be copied from the store-and-load memory 106 into a physical register in the physical register file pointed to by the phy_reg_id field 703. The done field 707 of the uLoad entry may be set to logic "1", indicating that the entry is eligible for "retirement." At retirement, the valid field 701 of the entry may be set to logic "0", and the head pointer of the uLoadQ may be incremented.

Figure 8:
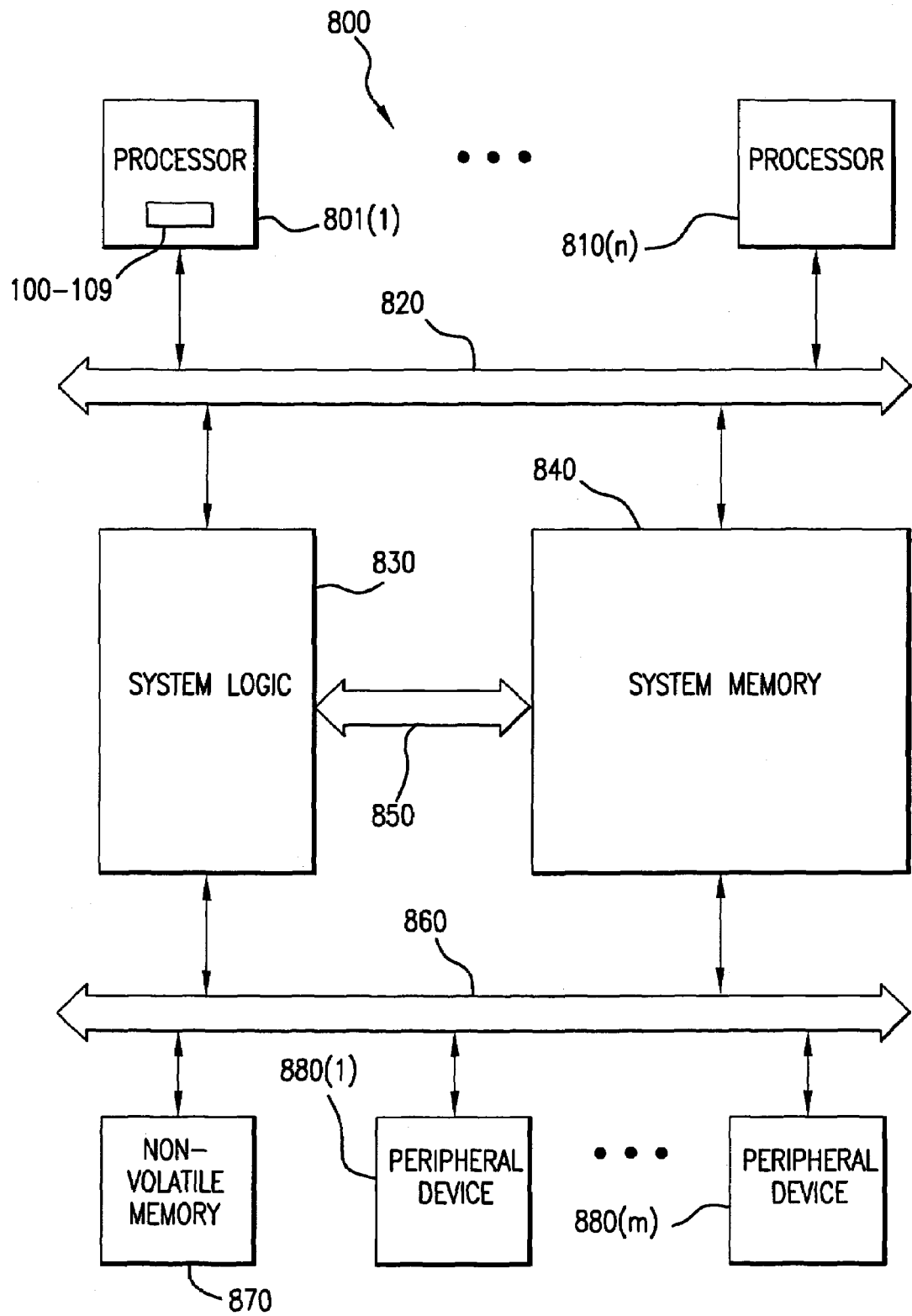
FIG. 8 is a block diagram of a computer system, which includes one or more processors and memory for use in accordance with an embodiment of the present invention.

FIG. 8 is a block diagram of a computer system, which may include an architectural state, including one or more processors and memory for use in accordance with an embodiment of the present invention. In FIG. 8, a computer system 800 may include one or more processors 810(1)-810(n) including elements 101-109 and coupled to a processor bus 820, which may be coupled to a system logic 830. Each of the one or more processors 810(1)-810(n) may be N-bit processors and may include a decoder (not shown) and one or more N-bit registers (not shown). System logic 830 may be coupled to a system memory 840 through a bus 850 and coupled to a non-volatile memory 870 and one or more peripheral devices 880(1)-880(m) through a peripheral bus 860. Peripheral bus 860 may represent, for example, one or more Peripheral Component Interconnect (PCI) buses, PCI Special Interest Group (SIG) PCI Local Bus Specification, Revision 2.2., published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 670 may be a static memory device such as a read only memory (ROM) or a flash memory. Peripheral devices 880(1)-880(m) may include, for example, a keyboard; a mouse or other pointing devices; mass storage devices such as hard disk drives, compact disc (CD) drives, optical disks, and digital video disc (DVD) drives; displays and the like.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A processor comprising:
    a physical register file;
    a register alias table memory having a capacity corresponding to a subset of architectural logical registers;
    store-and-load logic coupled to the register alias table memory; and
    a store-and-load memory coupled to the store-and-load logic;
    wherein the store-and-load logic is to copy a content of a respective physical register corresponding to an entry of a logical register evicted from the register alias table memory to the store-and-load memory, and, on a miss in the register alias table memory, to copy a content of an entry in the store-and-load memory to a physical register in said physical register file and insert a corresponding mapping in the register alias table memory.

2. The processor of claim 1, wherein the register alias table memory is a cache.

3. The processor of claim 1, wherein the store-and-load logic comprises a store queue to hold store operations to copy the content of the respective physical register to the store-and-load memory.

4. The processor of claim 1, wherein the store-and-load logic comprises a load queue to hold load operations to copy the content of the entry in the store-and-load memory to the physical register.

5. The system of claim 1, wherein the subset is determined by a frequency-of-access-threshold.

6. An apparatus comprising:
    a register alias table cache to map a logical register to a physical register, the register alias table cache having a capacity corresponding to a subset of architectural logical registers;
    store logic coupled to the cache to perform operations to save an existing content of the physical register if a cache entry corresponding to the logical register is evicted from the cache; and
    load logic coupled to the cache to perform operations to load a content to the physical register and to form a new entry in the cache if a needed mapping is not present in the cache.

7. The apparatus of claim 6, wherein the store logic is further coupled to a store-and-load memory to store the existing content of the physical register.

8. The apparatus of claim 6, wherein the load logic is further coupled to a store-and-load memory to load from the store-and-load memory the content to the physical register.

9. A method comprising:
    forming logical-to-physical register mappings in a register alias table cache, the register alias table cache having a capacity corresponding to a subset of architectural logical registers; and
    if a mapping in the cache needs to be evicted, copying a content of a logical register corresponding to the mapping from a corresponding physical register to a store-and-load memory associated with the cache.

10. The method of claim 9, further comprising copying the content into a field of a store operation in a store queue.

11. The method of claim 10, further comprising performing the store operation to copy the content of the field into the store-and-load memory.

12. The method of claim 9, further comprising checking a load queue of waiting load operations to determine if any requires a content of a logical register contained in a field in a store operation in the store queue.

13. A method comprising:
    forming logical-to-physical register mappings in a register alias table cache, the register alias table cache having a capacity corresponding to a subset of architectural logical registers; and
    if a needed mapping is not present in the cache, copying a content of a logical register corresponding to the needed mapping from one of a store operation in a store queue, and a store-and-load memory associated with the cache, into a physical register.

14. The method of claim 13, further comprising checking waiting store operations in the store queue to determine if any has a field containing a content of a logical register corresponding to the needed mapping.

15. The method of claim 14, further comprising, if a store operation has a field containing the content, copying the content from the field to the physical register.

16. The method of claim 14, further comprising, if no store operation has a field containing the content, copying the content from the store-and-load memory to the physical register.

17. The method of claim 13, further comprising inserting a new mapping corresponding to the logical register and the physical register in the register alias table cache.

18. A system comprising:
    a memory to hold instructions for execution; and
    a processor coupled to the memory to execute the instructions, the processor including:
        a register alias table cache to map a logical register to a physical register, the register alias table cache having a capacity corresponding to a subset of architectural logical registers;
        store logic coupled to the cache to perform operations to save an existing content of the physical register-if a cache entry corresponding to the logical register is evicted from the cache; and load logic coupled to the cache to perform operations to load a content to the physical register and to form a new entry in the cache if a needed mapping is not present in the cache.

19. The system of claim 18, wherein the store logic is further coupled to a store-and-load memory to store the existing content of the physical register.

20. The system of claim 18, wherein the load logic is further coupled to a store-and-load memory to load from the store-and-load memory the content to the physical register.

* * * * *